(12) United States Patent
Richardson

(10) Patent No.: US 8,862,395 B2
(45) Date of Patent: Oct. 14, 2014

(54) CODED MARKER NAVIGATION SYSTEM AND METHOD

(75) Inventor: James Joseph Richardson, Temecula, CA (US)

(73) Assignee: Raytheon Company, Waltham, MA (US)

( * ) Notice: Subject to any disclaimer, the term of this patent is extended or adjusted under 35 U.S.C. 154(b) by 370 days.

(21) Appl. No.: 13/017,376

(22) Filed: Jan. 31, 2011

(65) Prior Publication Data

US 2012/0197519 A1 Aug. 2, 2012

(51) Int. Cl.
*G01C 21/00* (2006.01)
*G01C 21/20* (2006.01)
*G01C 21/36* (2006.01)

(52) U.S. Cl.
CPC ............ *G01C 21/20* (2013.01); *G01C 21/3647* (2013.01)
USPC .......... 701/494; 701/408; 701/409; 701/32.5; 235/462.01; 235/462.08

(58) Field of Classification Search
USPC ......... 701/400, 472, 494, 216, 217, 408, 409, 701/32.5; 235/462.01–462.45, 472.01, 235/472.02, 472.03, 462.08
See application file for complete search history.

(56) References Cited

U.S. PATENT DOCUMENTS

| | | | | |
|---|---|---|---|---|
| 4,305,077 A * | 12/1981 | Tsumura | ....................... | 342/451 |
| 5,243,529 A * | 9/1993 | Kashiwazaki | ................. | 701/409 |
| 5,517,419 A * | 5/1996 | Lanckton et al. | ............. | 701/409 |
| 5,583,776 A * | 12/1996 | Levi et al. | ...................... | 701/400 |
| 6,859,729 B2 * | 2/2005 | Breakfield et al. | ................ | 701/2 |
| 7,689,001 B2 * | 3/2010 | Kim et al. | ...................... | 382/103 |
| 7,804,424 B2 * | 9/2010 | Iwane | ........................... | 340/916 |
| 7,826,969 B2 * | 11/2010 | Hein et al. | ..................... | 701/429 |
| 7,845,560 B2 * | 12/2010 | Emanuel et al. | ......... | 235/462.08 |
| 8,067,933 B2 * | 11/2011 | Rost et al. | ................ | 324/207.11 |
| 8,634,958 B1 * | 1/2014 | Chiappetta et al. | ........... | 700/245 |
| 2002/0022927 A1 * | 2/2002 | Lemelson et al. | ............ | 701/301 |
| 2005/0143916 A1 * | 6/2005 | Kim et al. | ...................... | 701/214 |
| 2008/0137912 A1 | 6/2008 | Kim et al. | | |
| 2008/0154495 A1 * | 6/2008 | Breed | ........................... | 701/208 |
| 2008/0154629 A1 * | 6/2008 | Breed et al. | ....................... | 705/1 |
| 2009/0076722 A1 * | 3/2009 | Darlington | .................... | 701/207 |
| 2010/0161179 A1 * | 6/2010 | McClure et al. | ................. | 701/41 |
| 2014/0082199 A1 * | 3/2014 | Johnson | ........................ | 709/225 |

FOREIGN PATENT DOCUMENTS

| EP | 1712879 A1 | 10/2006 |
|---|---|---|
| WO | 2009098319 A2 | 8/2009 |

OTHER PUBLICATIONS

Dulimarta et al., Mobile robot localization in indoor environment, May 1996, Elsevier Science Ltd.*

* cited by examiner

*Primary Examiner* — Thomas G Black
*Assistant Examiner* — Sara Nelson
(74) *Attorney, Agent, or Firm* — Lando & Anastasi, LLP

(57) ABSTRACT

A navigation system and method for determining a location of a navigator in a navigation environment using coded markers located within the navigation environment. In one example, the navigation system includes a camera apparatus configured to obtain an image of a scene containing images of at least one coded marker in a navigation environment, video analytics configured to read the at least one coded marker, and a processor coupled to the video analytics and configured to determine a position fix of a navigator based on a known location of the at least one coded marker.

17 Claims, 10 Drawing Sheets

CODED MARKER NAVIGATION SYSTEM AND METHOD

BACKGROUND

A well known example of a navigation system is the global positioning system (GPS) satellite-based system which uses a GPS receiver to receive location fixes from the GPS satellites to determine the location of the navigator within a navigation environment. The GPS receiver periodically receives information from broadcasting GPS satellites and uses that information to triangulate the position of the navigator. However, in certain environments, GPS systems suffer from limited availability of the GPS signals and fail to work as well as may be desired. For example, in an urban environment, tall buildings may obstruct or degrade GPS satellite reception. Obstruction or degradation of GPS reception because of limited view of the open sky, or because of signal multipath or reflection, may create a "GPS denied" environment in which the GPS receiver is unable to obtain a location fix from the GPS satellite.

There have been several attempts to address the sporadic loss of a GPS signal; however, the need for accurate absolute positioning in urban environments for transportation systems has few practical yet technically feasible solutions. Some solutions have attempted to use image processing or video analytics "scene matching" to determine the position of a sensor based on an image of the scene taken by the sensor. A drawback to these solutions however, is the need for an extensive database of scenery and enormous computational resources to perform the scene matching processing. The scenery database must also be kept current as seasonal or permanent changes to the physical environment can significantly impact scene matching accuracy. Another solution uses sophisticated "dead reckoning" calculations to locate the navigator when GPS reception is lost or is unavailable. However, such systems suffer significant drawbacks, including displacement and heading errors that accumulate over time (drift or bias), and, in commercially viable vehicle-based systems, an inability to adapt to rapid and frequent changes in speed and direction of the navigator.

SUMMARY OF INVENTION

Accordingly, there is a need for systems and methods of navigation, particularly in GPS denied environments that can provide continuous location information of the navigator but do not require an extensive scenery database, or large computational resources, and which are easy to implement. Aspects and embodiments of the present invention are directed to navigation systems and methods that use location information obtained from coded markers placed within the navigation environment to determine a position fix on the navigator. Dead reckoning calculations can be used in-between the position fixes to obtain continuous location information of the navigator. This location information can be correlated to a map database and displayed using a map-based display, as discussed further below. The system may also include a GPS unit; and the location information from the coded markers may be used to supplement location information obtained from the GPS unit.

According to one embodiment, a method of determining a location of a navigator comprises acts of obtaining an image of a scene including at least one coded marker; reading the at least one coded marker in the image; and determining a position fix on the location of the navigator based on a known location of the at least one coded marker.

In one example of the method, reading the at least one coded marker in the image further comprises extracting an image of one of the at least one coded marker from the image of the scene, decoding the image of one of the at least one coded marker into a database value, and accessing a database to retrieve the known location of one of the at least one coded marker based on the database value. In another example, reading the at least one coded marker in the image further comprises extracting an image of one of the at least one coded marker from the image of the scene, and decoding the image of one of the at least one coded marker into the known location of the at least one coded marker. Determining a position fix on the location of the navigator may comprise acts of determining a relative azimuth offset between the navigator and the at least one coded marker in the image of the scene, and geometrically calculating the position fix on the navigator from the relative azimuth offset. In another example, determining a position fix on the location of the navigator comprises determining a distance from the navigator to the coded marker by determining dimensions of the at least one coded marker in the image of the scene. In another example, obtaining the image comprises obtaining a plurality of images of the scene at different times as the navigator moves, and determining a position fix on the location of the navigator further comprises determining a corresponding plurality of relative azimuth offsets between the navigator and the at least one coded marker from the plurality of images of the scene, and determining a distance from the navigator to the at least one coded marker based on the plurality of relative azimuth offsets to the marker. The method may comprise correlating the position fix on the location of the navigator to map data.

In one example, obtaining an image of a scene further comprises obtaining the image using a 360 degree camera. In one example, the coded marker(s) include barcode(s). In another example, determining a position fix on the location of the navigator further comprises obtaining location information of the navigator using a GPS unit, and in a GPS denied environment, supplementing the location information from the GPS unit with the position fix obtained from at least one coded marker. Determining a position fix on the location of the navigator may further comprise determining a plurality of position fixes, and performing dead reckoning computations between the plurality of position fixes to provide for continuous location of the navigator. In one example, performing the dead reckoning computations between the plurality of position fixes comprises monitoring speed of the navigator, determining a heading of the navigator, and extrapolating the location of the navigator based on one of the plurality of position fixes, the speed of the vehicle and the heading.

According to another embodiment, a navigation system comprises a camera apparatus configured to obtain an image of a scene containing images of at least one coded marker in a navigation environment, video analytics configured to read the at least one coded marker, and a processor coupled to the video analytics and configured to determine a position fix of a navigator based on a known location of the at least one coded marker.

In one example, the navigation system further includes a database comprising at least one known location of the at least one coded marker, and at least one database value correlated to the at least one known location of the at least one coded marker. In this example, the video analytics is further configured to extract the image of the at least one coded marker from the image of the scene and to translate the image of one of the at least one coded marker into the at least one database value. In another example, the processor is further configured to determine the position fix on the location of the navigator by determining a relative azimuth offset between the navigator and the at least one coded marker in the image of the scene and geometrically determining the position fix on the navigator from the relative azimuth offset. The processor may be further configured to determine the position fix on the location of the navigator by determining a distance of the navigator to one of the at least one coded marker.

In another example, the navigation system further comprises a map database, wherein the processor is configured to relate the position fix of the navigator to the map database, and a display configured to display a visual representation of the map database and to place the position fix of the navigator in the visual representation. The navigation system may further comprise a GPS unit configured to obtain location information of the navigator, wherein the processor is configured to supplement the location information of the navigator obtained from the GPS unit with a position fix based on the known location of the at least one coded marker. In one example, the processor is further configured to obtain a plurality of position fixes based on the known location of the at least one coded marker and to perform dead reckoning computations in-between the plurality of position fixes to provide for continuous location of the navigator. The camera apparatus may include a 360 degree camera. In one example, the at least one coded marker comprises at least one barcode.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
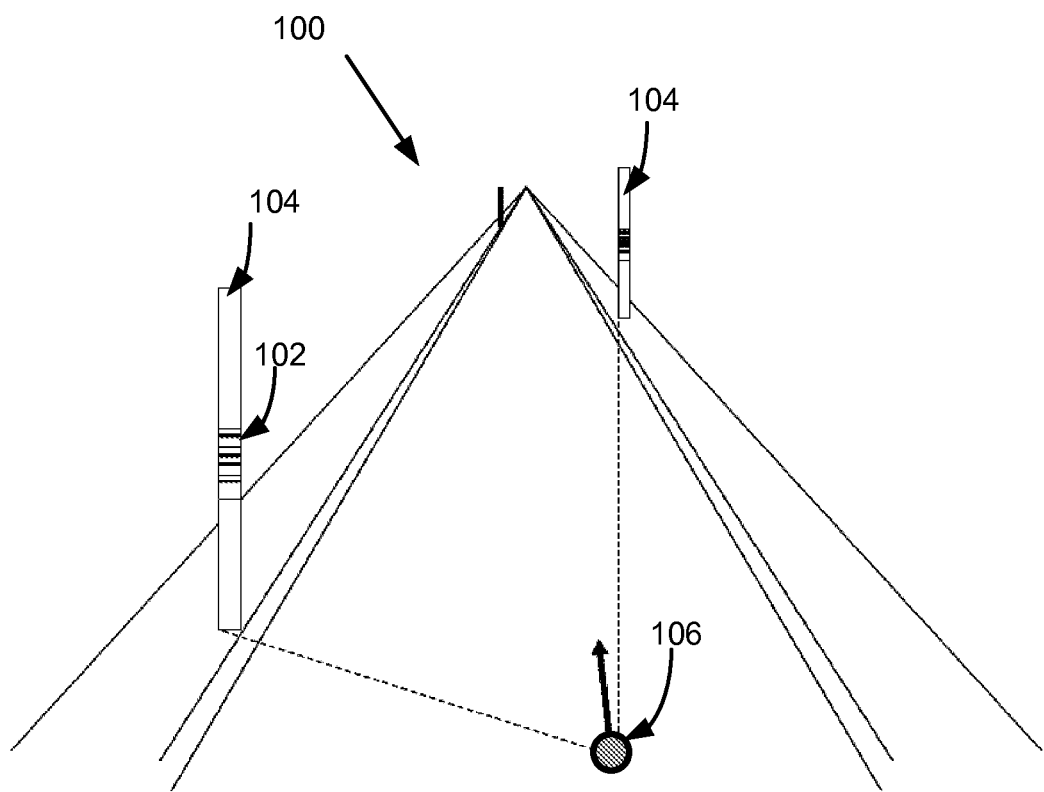
FIG. 1 is a schematic diagram of one example of a navigation environment containing coded markers, according to aspects of the present invention.

As discussed above, conventional solutions for obtaining location information of a navigator in "GPS denied" environments suffer from several disadvantages, such as being computationally expensive and/or lacking accuracy and/or adaptability. As used herein, the term "navigator" may refer to a vehicle, a person or any object traveling within a navigation environment. Accordingly, there is a need for a way to navigate in these environments by providing continuous and accurate location information of the navigator without the use of complex systems. Aspects and embodiments are directed to a system and method of navigation that overcomes the limitations and drawbacks of conventional solutions, while providing a solution that is functionally uncomplicated and easy to implement.

According to one embodiment a navigation system uses coded markers located within the navigation environment to provide position fixes. These coded markers may be placed on already-present infrastructure within the navigation environment, such as, for example, on roadside lamp posts or utility poles, buildings, or other infrastructure objects. In one embodiment, a camera is used to obtain images of the navigation scene, and a system of video analytics may then use image processing to identify the coded markers in the image of the scene. A processor, which may be part of the video analytics or a separate component, may read the coded markers to obtain the known locations of the coded markers deployed in the navigation environment, as discussed further below. Once the location of the coded marker is determined, the processor may determine a position fix on the navigator by determining the distance from the navigator to the known location of the deployed coded marker. In another embodiment, where accuracy of the absolute position of the navigator may be less important, the position of the navigator can be estimated based the location of the coded marker. The position fix of the navigator may then be correlated to map data and displayed on a navigation system display, which may show a visual representation of the navigation environment.

A system and method of navigation according to aspects of the invention may be implemented as a stand alone system or may be used to supplement a GPS-based system, as discussed further below. Instead of requiring an extensive and potentially very large scenery database as used by conventional scene matching solutions, the storage requirements for a coded marker database are substantially smaller. In addition, extracting the coded marker image from the navigation environment and obtaining the location information requires fewer processing resources than traditional scene matching techniques. The computational burden on the system is reduced because the simple visual characteristics of the coded markers allow the images to be easily read and processed. Furthermore, the system may be integrated with and take advantage of features and benefits provided by existing GPS systems. GPS units are widely available in the market and are available with many configurations and options. As described further below, the system may also use the existing map database and map-based display already integrated into the GPS unit.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated one example of a navigation environment 100 in which a navigation system and method employing coded markers is implemented. In the illustrated example, coded markers 102 are deployed on roadside infrastructure 104. For example, such roadside infrastructure may include lamp posts, utility poles, street signs, buildings, etc. Any infrastructure in the visible range of the navigator 106 and proximate to the roadway may be used. The coded markers 102 may be implemented as a series of vertical or horizontal lines resembling "barcodes." A barcode is an optical machine-readable representation of data. Many types of barcodes can be used for the coded markers 102, including one-dimensional and two-dimensional barcodes. In one example, the coded marker 102 is a one-dimensional barcode similar to the conventional Universal Price Code (UPC). In this example, the barcode includes a sequence of alternating bars and spaces representing binary bits (ones and zeroes) of data. Sequences of binary bits may represent digits, letters, symbols, etc. as known to those skilled in the art. The barcode may also include guard bars, which separate groups of sequences, as well as, starting and ending bars, which signify a beginning and an end to the barcode. Although the following discussion and example may refer primarily to the use of barcodes, it is to be appreciated that other types of coded markers may be used, such as, for example block patterns, color-coding or alphanumeric character codes.

Figure 2:
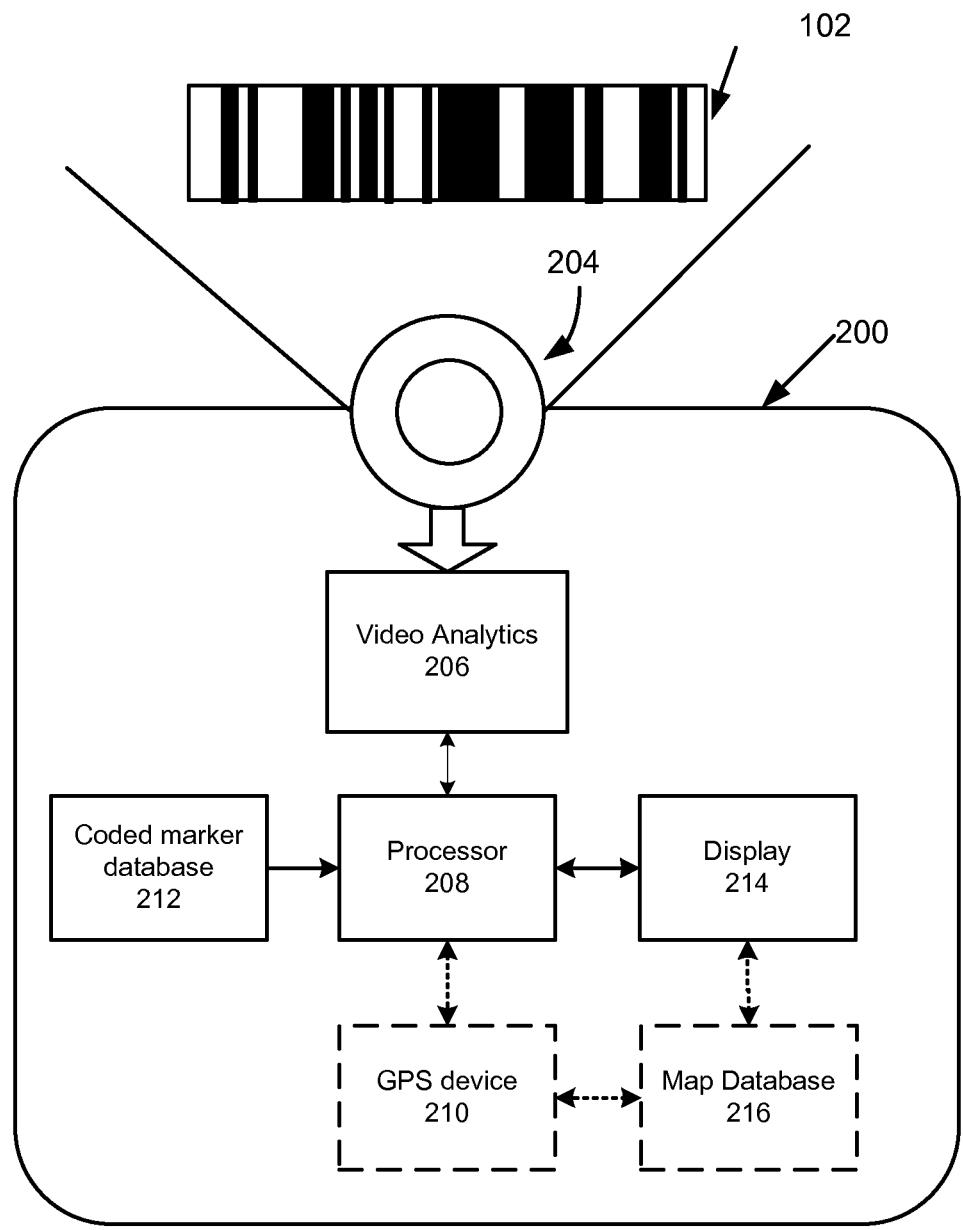
FIG. 2 is a block diagram of one example of a navigation system, according to aspects of the present invention.

Referring now to FIG. 2, there is illustrated a block diagram of one example of a navigation system 200. The navigation system 200 includes an imaging apparatus, such as a camera apparatus 204, along with video analytics 206, a processor 208, a coded marker database 212, and a display 214. The navigation system may also optionally include a GPS unit 210 and a map database 216, as discussed further below. It is to be appreciated that the navigation system 200 may be used in any navigation application such as personal navigation for a tourist or a hiker, and/or for vehicle navigation. Accordingly, although the following examples may refer primarily to the navigation system being used in conjunction with a vehicle moving through the navigation environment, and therefore the coded markers may be placed on roadside infrastructure, it is to be appreciated that the navigation system is not limited to vehicular use and the coded markers may be deployed anywhere in the relevant navigation environment, not limited to roadside infrastructure. The navigation system may be implemented as a self-contained unit, for example a handheld unit or unit configured for mounting on or in a vehicle, or may be integrated within the vehicle. In addition, the navigation system may be a stand alone system and may be used exclusively to determine the location of the navigator, or may be used in conjunction with a GPS unit to supplement GPS satellite data in a GPS denied environment, as discussed further below.

According to one embodiment, the camera apparatus 204 is configured to capture images of the navigation environment within its field of view, and accordingly may include one or more imaging sensors along with control apparatus for managing various functions of the camera apparatus 204. The camera apparatus 204 may also include memory for storing the images as well as executable programming used to manage and control various functions on the camera. A variety of different cameras may be used, including, for example, a still-frame digital photo camera, such as a Digital Single-Lens Reflex (DSLR) camera or a digital point-and-shoot camera. The camera may be disposed to take panoramic or 360 degree images of the scene. In one embodiment, the camera employs a panoramic lens that may be integrated with or attached to the camera. One example of such a camera lens is the 0-360 PANORAMIC OPTIC™, which attaches to a digital camera and is provided by www.0-360.com. The 0-360 PANORAMIC OPTIC™ and the associated software create a single seamless panoramic image around the entire 360 degree horizontal field of view and 115 degrees of the vertical field of view. The camera combined with the 0-360 PANORAMIC OPTIC™, may capture the image from 52.5 degrees above the horizon to 62.5 degrees below the horizon.

In one example, the camera apparatus 204 is configured to take continuous pictures of the scene and direct the images to video analytics 206. The images may be taken at periodic intervals, for example, every second, every few seconds, or every fraction of a second. The speed at which the camera captures images may be varied or adjusted. For example, depending on the speed at which the navigator is traveling, it may be desirable to increase the rate of capture to ensure that a sufficient number of images of the coded markers are obtained. In another example, the camera apparatus 204 is a video camera. The video camera may take continuous video recording of the navigation environment and may compress the video recording to a smaller size using an encoder. The size of the compressed video recording may depend on the quality of the recording needed to extract coded marker images. In one example, the camera monitors the environment for the coded markers. If the coded marker is detected within the scene, the video camera may capture still frame images in addition to the video recordings.

Still referring to FIG. 2, the images taken by the camera are provided to the video analytics 206, which uses image processing to detect, extract and process an image of the coded marker 102 from the image of the navigation scene 100. Video analytics 206 may include both software and hardware components and may be implemented using hardware devices such as field-programmable gate arrays (FPGA's), application-specific integrated circuits (ASIC's), microcontrollers, programmable logic devices (PLD's) or other such devices known in the art. In one embodiment, video analytics 206 is incorporated into the camera apparatus 204. The camera apparatus 204 may also use other sensors/equipment to improve coded marker detection under all lighting and/or weather conditions. For example, High Dynamic Range (HDR) cameras may be employed to compensate for low light or shadowed conditions. The barcodes may also be reflective or luminescent to improve detection in low-light conditions.

Any methods or systems of video analytics using pixel image decoding or other camera object detecting technology may be used, as would be understood by those skilled in the art, given the benefit of this disclosure. In one example, video analytics 206 analyzes all of the pixels in the image to identify pixels that match the qualities associated with the image of the coded marker. Video analytics 206 may process the matched pixel according to set parameters before proceeding to the next pixel. In another example, video analytics 206 use more intelligent pixel processing by identifying and extracting batches of pixels matching certain characteristics; for example such characteristics as found in coded marker images. These pixels may be filtered out of the image of the scene and processed separately. Such filtering techniques may, for example, be able to differentiate between the foreground and background of the image by comparing successive scene images. The filter may also separate specific color value in the specified range matching the color value range found in the coded marker image. Because the image of the coded marker may be visually distinct from the image of the surrounding environment, the video processing required to identify and match the coded marker can be performed quickly, and may generally be far simpler than the video processing required for full "scene matching."

Figure 3:
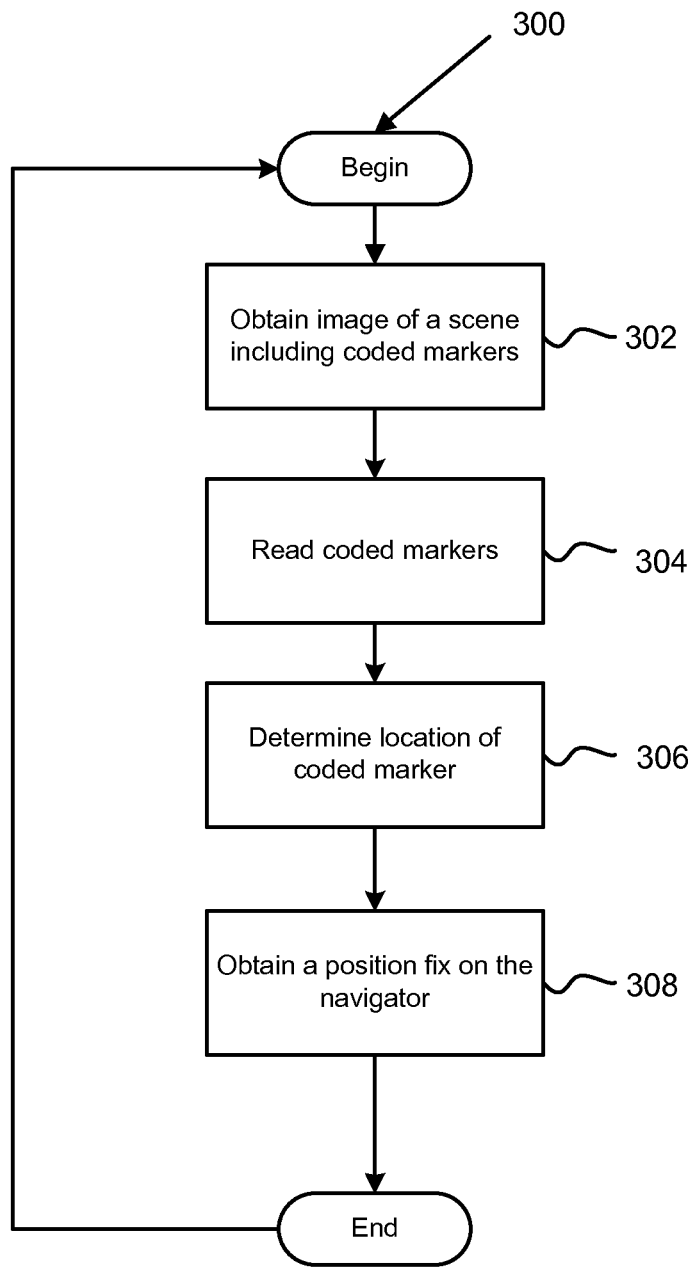
FIG. 3 is a flow diagram illustrating one example of a method of determining a location of a navigator, according to aspects of the present invention.

A method 300 of determining the location of the navigator, according to one embodiment, is now described with reference to FIG. 3. The camera apparatus 204 may obtain the image of the navigation scene 100 including one or more coded markers 102 (step 302). In step 304, the video analytics 206 reads the coded marker by processing the image of the scene to extract the image of the coded marker from the image of the scene and decoding the marker. Step 306 includes determining a location of the coded marker. As described above, the coded marker 102 may be a series of vertical or horizontal bars resembling the UPC barcode. The groups of bars and spaces may represent certain digits. Sequences of digits may be a coded marker identification value or a database value, which may be compared by the processor 208 against the known deployment location of the coded markers in the coded marker database 212. Alternatively, sequences of digits may be translated into geographic coordinates, such as longitude and latitude, representing location information of the coded markers 102. Once the location of the coded marker is known, the position fix on the navigator may then be determined (step 308). In one example, this is achieved by determining the relative azimuth and/or the distance of the navigator to the coded markers, as discussed further below. The method 300 may be repeated continuously or at predetermined intervals to determine a plurality of position fixes on the location of the navigator.

Figure 4:
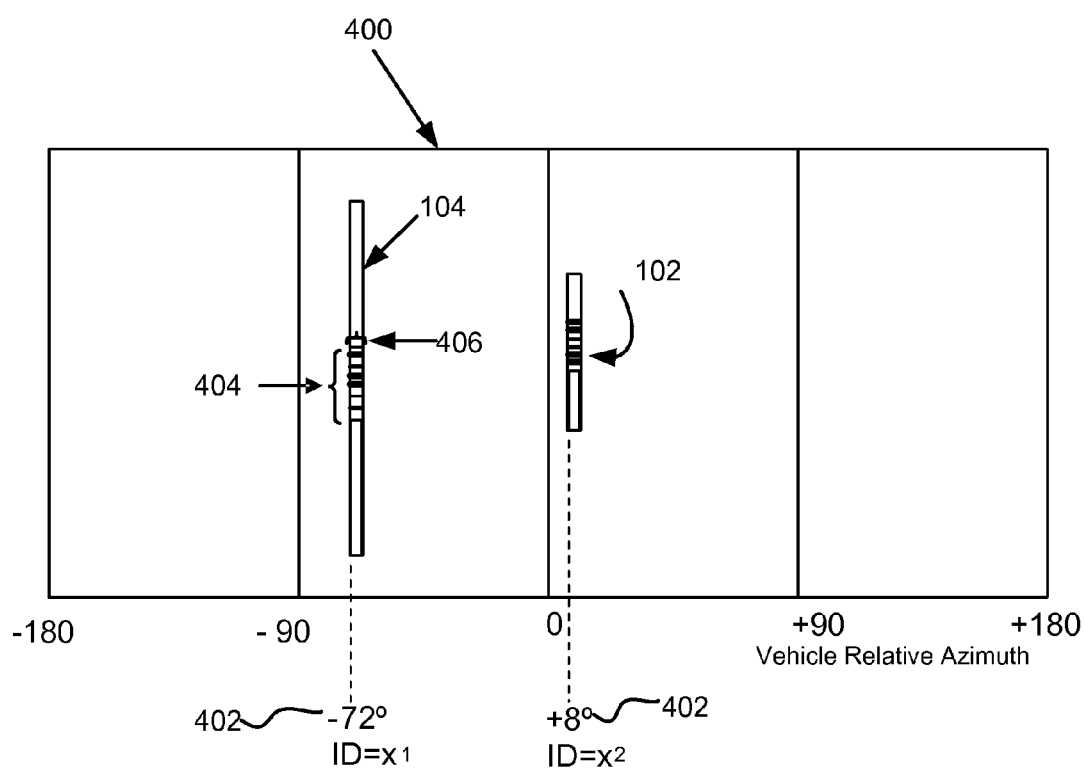
FIG. 4 is a schematic diagram of one example of determining a position fix on the navigator using a known deployment location of the coded marker, according to aspects of the present invention.

FIG. 4 illustrates examples of determining a position fix on the navigator from the coded markers, including the image of the scene 400, road infrastructure 104, and coded markers 102, labeled X1 and X2. As described above, the coded markers 102 may be barcodes placed on road infrastructure 104 in the navigation environment 100. The image of the scene 400 is obtained as described above by camera apparatus 204. In one embodiment, the processor 208 determines a position fix on the navigator by processing the image 400. The processor 208 may be implemented using hardware devices such as FPGA's, ASIC's, microcontrollers, PLD's or other such devices known in the art. As discussed above, the processor 208 may be part of the video analytics 206 or a separate component. In one embodiment, the processor 208 determines the position fix on the navigator by determining relative azimuth offsets of the coded marker images and geometrically determining the location of the navigator based on the offsets. The azimuth offset to the road infrastructure 104 and therefore the coded marker is found by determining positive or negative value of deviation 402 from the relative azimuth value of zero (which by definition may typically be aligned with the navigator's forward heading). In some examples, the distance between the coded marker(s) 102 and the navigator is also determined and used in conjunction with the deviation 402 to determine an absolute position of the navigator, as discussed below.

Figure 5A:
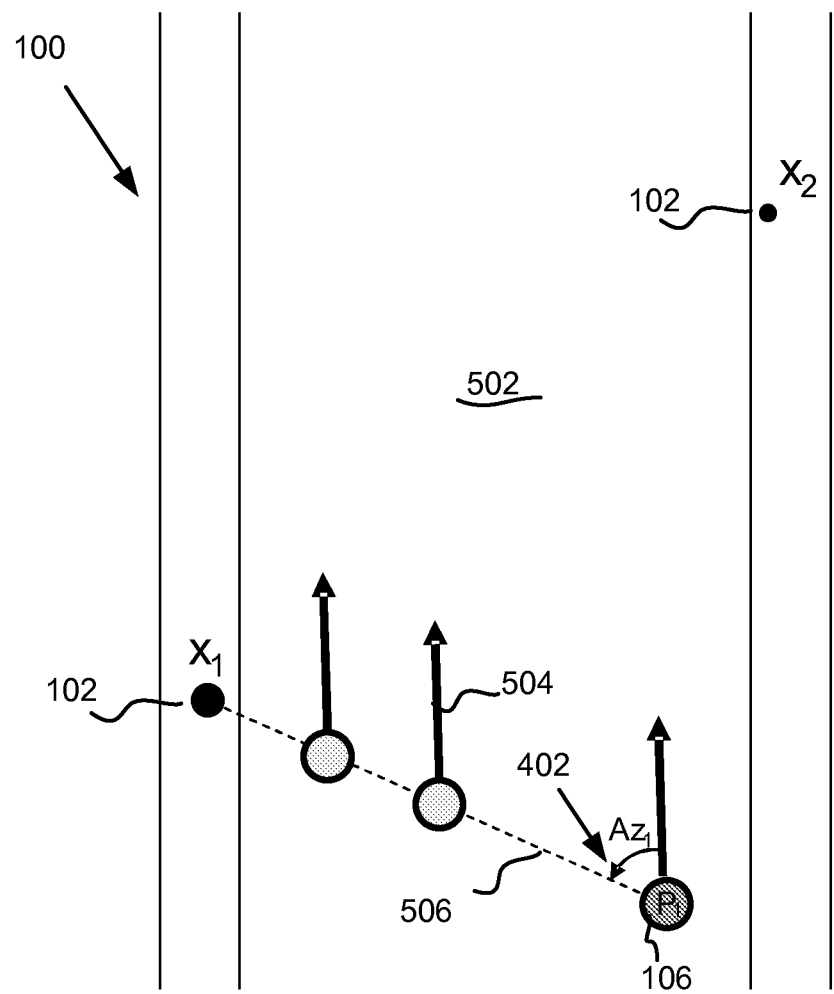
FIG. 5A is a schematic diagram of another example of determining a position fix on the navigator, according to aspects of the present invention.
Figure 5B:
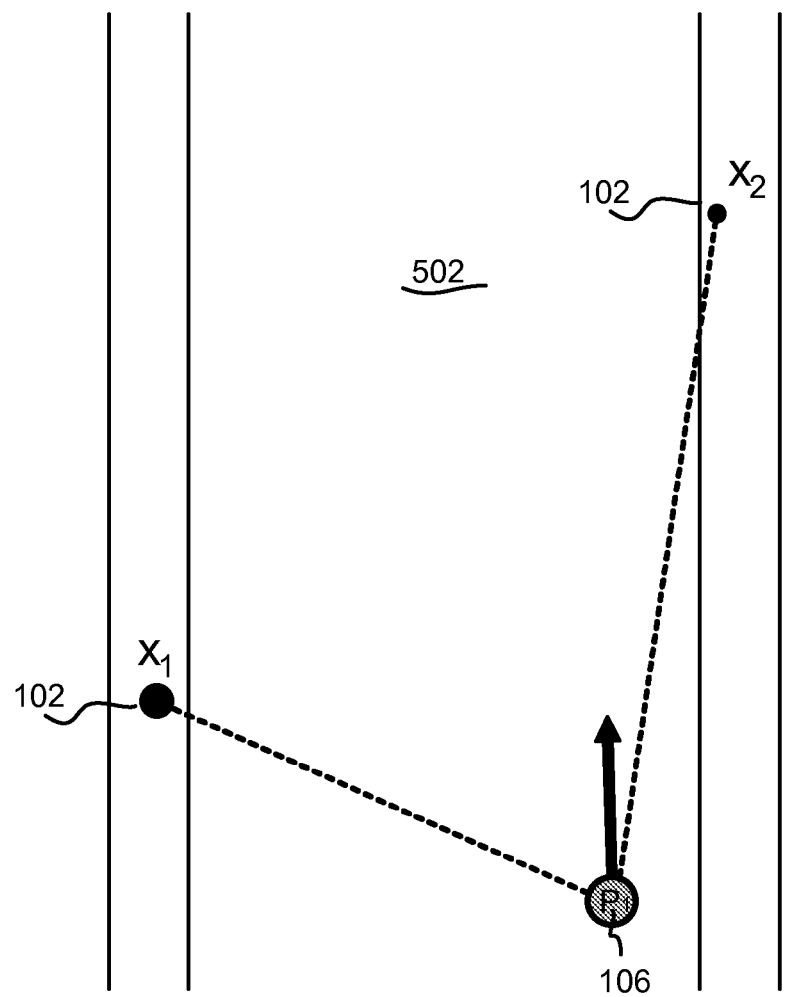
FIG. 5B is a schematic diagram of another example of determining a position fix on the navigator, according to aspects of the invention.
Figure 5C:
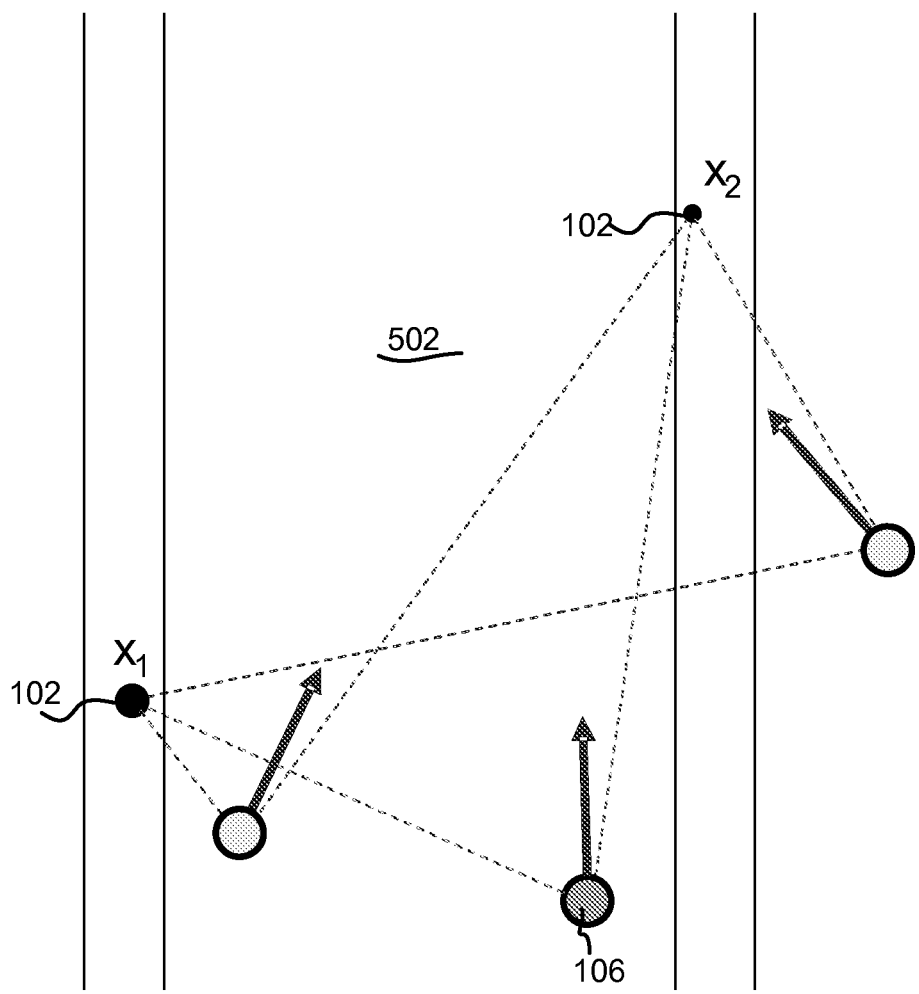
FIG. 5C is a schematic diagram of another example of determining a position fix on the navigator, according to aspects of the invention

Referring to FIG. 5A, there is illustrated one example of determining a position fix on the navigator 106 based on reading one coded marker 102 (labeled X1). In this example, the navigator is assumed to be located on the roadway 502, and the navigator's heading, represented by arrow 504, is assumed to be aligned with the roadway heading. In this example detecting and reading one coded marker, X1, places the navigator 106 somewhere on the line-of-sight 506 between the navigator and the coded marker X1; however, an exact location of the navigator cannot be determined, absent further information, such as the distance between the navigator and the coded marker. This example provides a general estimate of the location of the navigator 106, and may be sufficient for some applications. However, detection and reading of two coded markers 102, allows a precise location of the navigator 106 to be determined, as illustrated in FIG. 5B, given the assumptions noted above and without requiring any information regarding the distance between the navigator and the coded markers. Specifically, by obtaining the relative azimuths to two different coded markers 102 at the same time (i.e., by processing the same image that contains two coded markers), two lines can be drawn from the two coded markers, at the determined azimuth offsets, which cross at the position of the camera 204, and therefore of the navigator 106, providing the position fix of the navigator at the time the image 400 is taken. This triangulation method may be used provided that two coded markers 102 can be read in the image 400, regardless of the distance from the navigator to the markers. If no assumptions are made regarding the location and/or heading of the navigator 106, then, absent any distance-to-marker information, detection and reading of two markers provides a general estimate of the location of the navigator, but may not place the navigator at a specific position, as illustrated in FIG. 5C. Thus, determining the relative azimuth offsets between the navigator 106 and detected coded marker(s) 102 can be used to obtain a general, or in some circumstances, precise position fix on the navigator.

Referring again to FIG. 4, in another embodiment, the processor 208 determines the absolute position fix on the navigator by determining the distance of the navigator from the coded markers by determining dimensions of the coded marker images. As illustrated in FIG. 4, the barcodes have dimensions of height 404 and width 406. The height of the coded marker image can be quantified by the number of pixels in the image at a given distance away from the camera. For example, five pixels may represent one millimeter of height at the given distance away from the camera. Using the height 404 of the coded marker, the distance of the navigator from the coded marker may be extrapolated. The relationship may be directly proportional. In other words, the larger the height of the coded marker appears in the image 400, the closer the coded marker is to the navigator. The processor 208 may determine the position fix of the navigator based on predetermined height of the coded markers at a given distance from the camera.

The navigation system may use either or both methods of determining the position fix of the navigator, described above. In one embodiment, if two coded markers are visible to the camera, only the geometric determination method using relative azimuths is used to determine the absolute position of the navigator. If only one coded marker is visible in the environment, an absolute position fix on the navigator may not be obtained by the geometric determination method, and therefore if an absolute position fix is desired, the marker dimension method may be used instead. In another embodiment, the processor 208 is configured to combine the geometric determination and the marker dimension methods to determine the absolute position of navigator.

Figure 6:
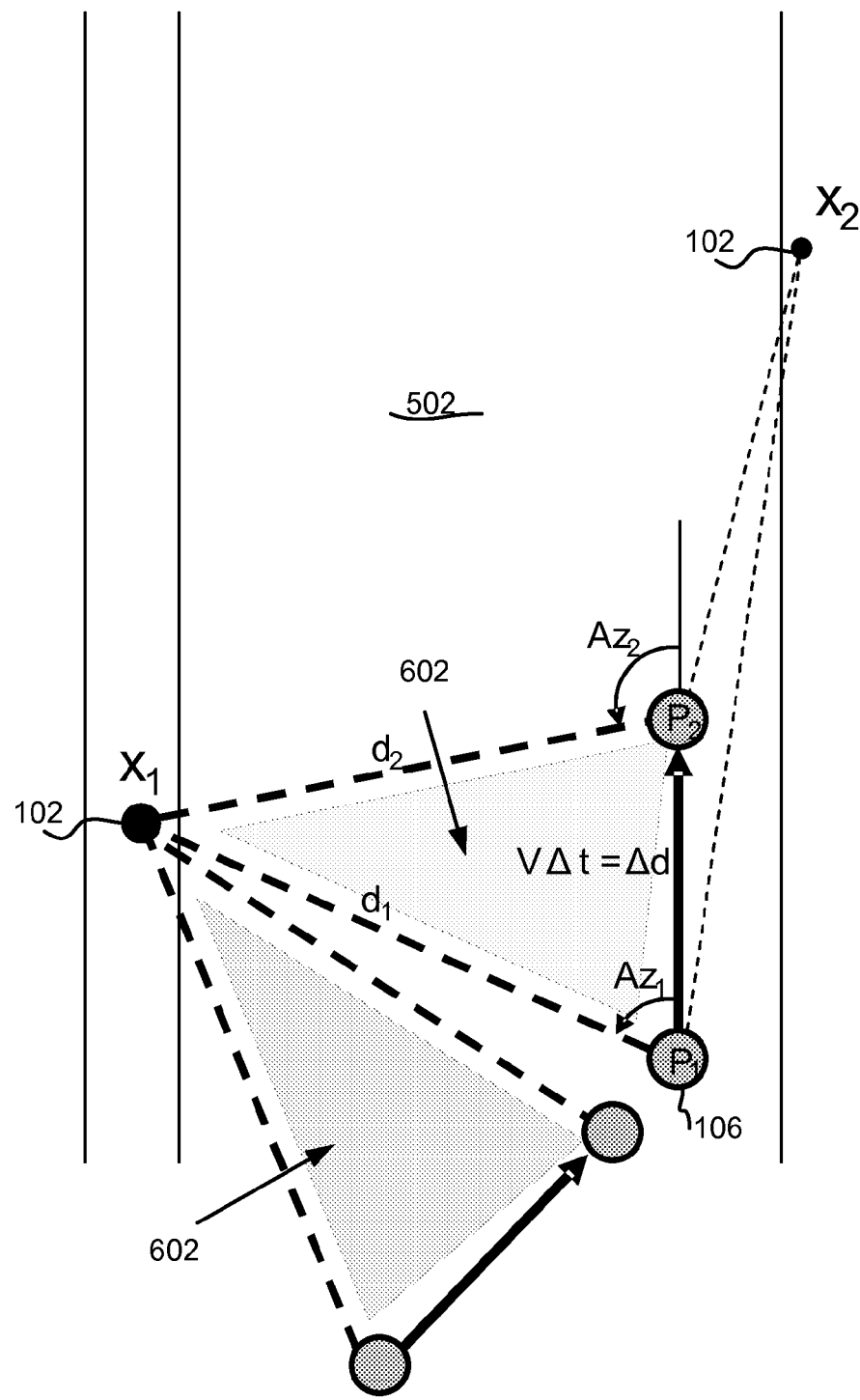
FIG. 6 is a schematic diagram of another example of determining a position fix on the navigator using both relative azimuth and distance between the navigator and the coded markers, according to aspects of the invention.

For example, referring to FIG. 6 there is illustrated one example of geometrically determining both distance-to-marker information and the absolute position fix on the navigator from successive images of the scene 400 using relative azimuth determinations. For the purposes of the calculations, the direction of the roadway may be assumed to align with the navigator heading and a relative azimuth value of zero. Images are taken at positions of the navigator P1 and P2, and the distance traveled between the images, Δd is computed by the formula:

$$\Delta d = V \Delta t;$$

where V is the velocity of the navigator and Δt is the time between when the images at P1 and P2 are taken. The relative azimuths Az1 and Az2 between the coded marker X1 the navigator 106 at each position P1 and P2, respectively, are determined from the two images. A triangle 602 can be formed by drawing lines from the coded marker X1 to the positions of the navigator P1 and P2, and between the positions P1 and P2. The distances of the navigator from the coded marker X1 at each position, d1 and d2, respectively, can be determined from the following equations based on the law of cosines:

$$d1^2 = d2^2 + \Delta d^2 - 2 \cdot \Delta d \cdot d2 \cdot \cos(180 - Az2); \text{ and}$$

$$d2^2 = d1^2 + \Delta d^2 - 2 \cdot \Delta d \cdot d1 \cdot \cos(Az1).$$

In circumstances where two coded markers X1 and X2 are both visible in the images 400, the relative azimuth angles and distances between the navigator at each position P1 and P2 and the second coded marker X2 may be similarly determined. As will be appreciated by those skilled in the art, given the benefit of this disclosure, in circumstances where only one coded marker 102 is visible, and absent the assumption of navigator heading being aligned to roadway heading, the exact location of the navigator 106 may not determined. On the other hand, with multiple coded markers visible in successive images taken at navigator positions P1 and P2 that are a sufficient Δd apart, both the exact locations and exact heading of the navigator between those locations may be explicitly calculated.

Figure 7:
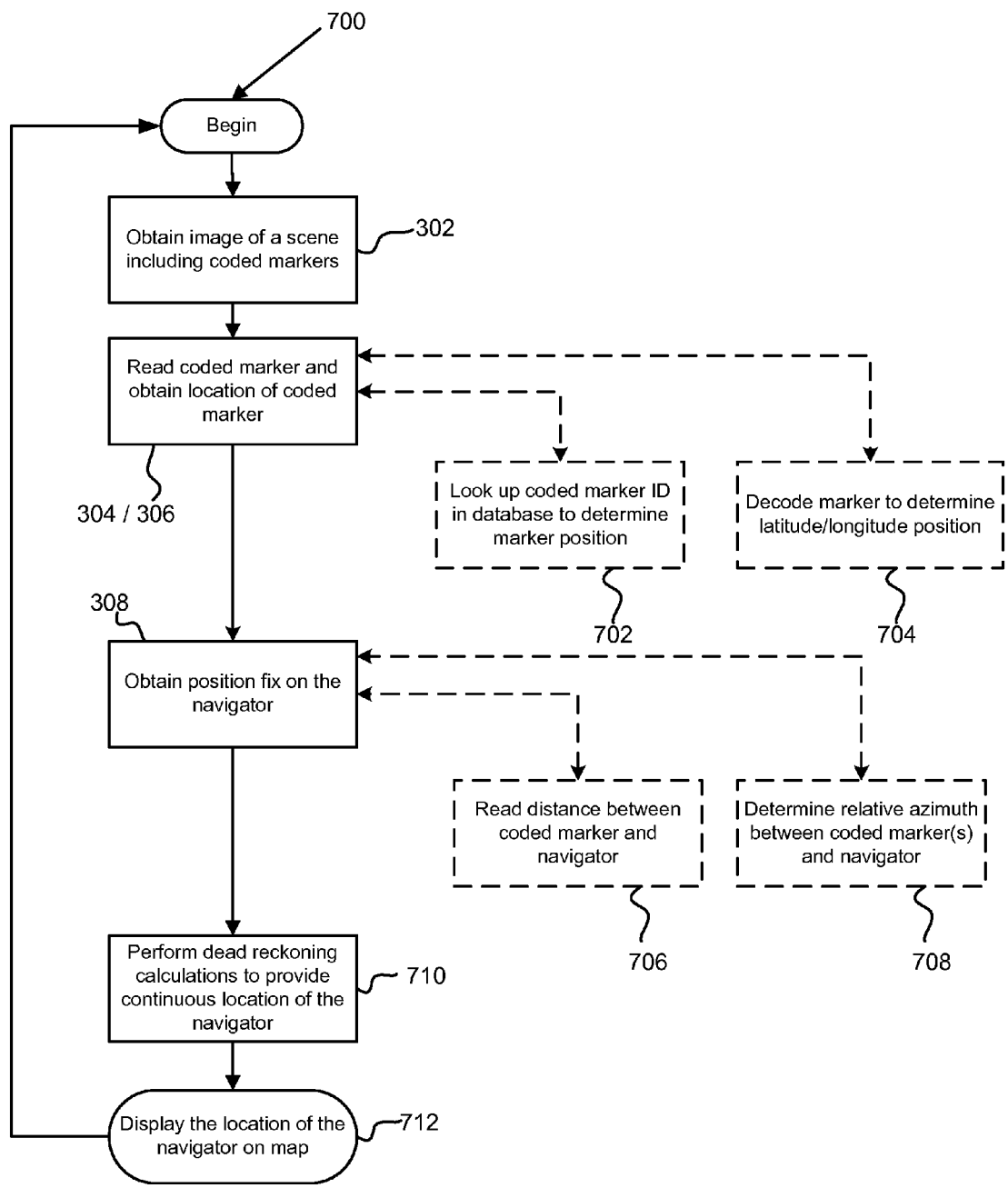
FIG. 7 is a flow diagram of one example of a method of determining a location of the navigator, including a step of performing dead reckoning calculations, according to one aspect of the present invention.

The method and system described above may also perform dead reckoning calculations in-between the position fixes to supplement the location data obtained from the coded markers, to provide continuous location information of the navigator. Such dead reckoning calculations are often performed in conventional GPS-based systems in between instances of satellite data received by the GPS unit. Accordingly, referring to FIG. 7, there is illustrated a flow diagram of another example of a method of determining the location of the navigator that includes using dead reckoning between position fixes. As described above, the method 700 includes obtaining an image of the scene that contains the coded markers (step 302), and reading the coded markers in the image and determining the location of the coded markers (steps 304 and 306), which may include looking up an identification number of the coded marker in a database (step 702) to determine the deployment position of the coded marker, or directly decoding the coded marker (step 704) to obtain the position of the coded marker, for example, in latitude and longitude, as discussed above. The method 700 further includes obtaining the position fix on the navigator (step 308), which may include determining the distance of the coded marker from the navigator (step 706) and/or determining the relative azimuth between the navigator heading and the coded marker (step 708), as discussed above. In one embodiment, the method 700 also includes performing dead reckoning calculations to provide continuous location of the navigator (step 710) and optionally displaying the location of the navigator on the map-based display (step 712). After the position fix on the navigator is obtained at step 308, dead reckoning calculations are performed (step 710) thereby providing uninterrupted location of the navigator.

In one example, dead reckoning calculations estimate the location of the navigator by noting the starting position of the navigator, monitoring the velocity and/or acceleration/deceleration of the navigator and the path or heading of the navigator. The dead reckoning calculations extrapolate the position fix of the navigator if the navigator traveled at the same velocity/acceleration and in the same heading. It can be appreciated that the accuracy of the position fix obtained using dead reckoning calculations depends on the accuracy and availability of sensor data. Different techniques can be used to obtain this data. For example, the system may use various sensors such as differential or digital speed information, odometer pulses, accelerometers, radar, optical or acoustic sensors, tachometers, and/or gyroscopes, which may be associated with the vehicle. Other embodiments of the system may combine data from the sensors with map data to more accurately plot the course of the navigator along curves and turns in the road.

Common GPS navigation systems are integrated with a map database representing a road network and a map-based display showing a visual representation of the road network. These navigation systems correlate GPS-based position fixes to the map database and show the location of the navigator on the map-based display. According to one embodiment, the navigation system includes such a map database 216 and map-based display 214, or is integrated into a GPS-based system that includes a map database and a map-based display. In one example GPS obtained location information is replaced or supplemented with position fixes obtained from the coded markers. In one embodiment, the continuous location information obtained in step 710 is correlated to the map database 216 and displayed on the display 214 (step 712). The map database 216 represents the road network, which includes basic elements and properties of those elements. The basic elements may consist of nodes, links and areas. The properties of those elements describe geographic coordinates of the elements, the shapes of the areas, addresses of the nodes, and/or road class of the links. The road network may also contain points of interest. The known location of the coded marker may be encoded as a node or a point of reference within the map database 216.

In one example, the display 214 of the navigation system 200 shows the visual representation of the road network. The visual representation may be in the form of an interactive three-dimensional (3D) map. The visual representation may show the basic elements and points of interests of the road network in the vicinity of the navigator. As the navigator 102 moves through the navigation environment 100, the 3D-map may move with the navigator and adapt to the changing elements. The 3D map may also show the location of the known coded markers 102 and the location of the navigator. Any type of display may be utilized, including a Liquid Crystal Display (LCD), a Plasma Display or Light Emitting Diodes (LED) Display.

As discussed above, in one embodiment, the navigation system 200 is integrated with a GPS unit 210. Where a GPS signal is available, GPS unit 210 receives information from broadcasting GPS satellites, and uses that data to determine the position of the navigator. For example, the GPS unit 210 may perform triangulation calculations by comparing data from one GPS satellite to data received from other GPS satellites to determine the location of the navigator. However, as discussed above, in "GPS denied" environments, the GPS unit 210 may not be able to receive information from GPS satellites due to blocked lines of sight to the satellites. For example, when the navigator is in an urban canyon, a parking garage, near trees or in a tunnel or because of signal reflection or multipath propagation. Even after the navigator leaves the "GPS denied" environment the GPS unit may not be able to immediately determine the location of the navigator. In these or similar circumstances and in these GPS denied environments the location of the navigator may be determined using the coded markers as discussed above.

Figure 8:
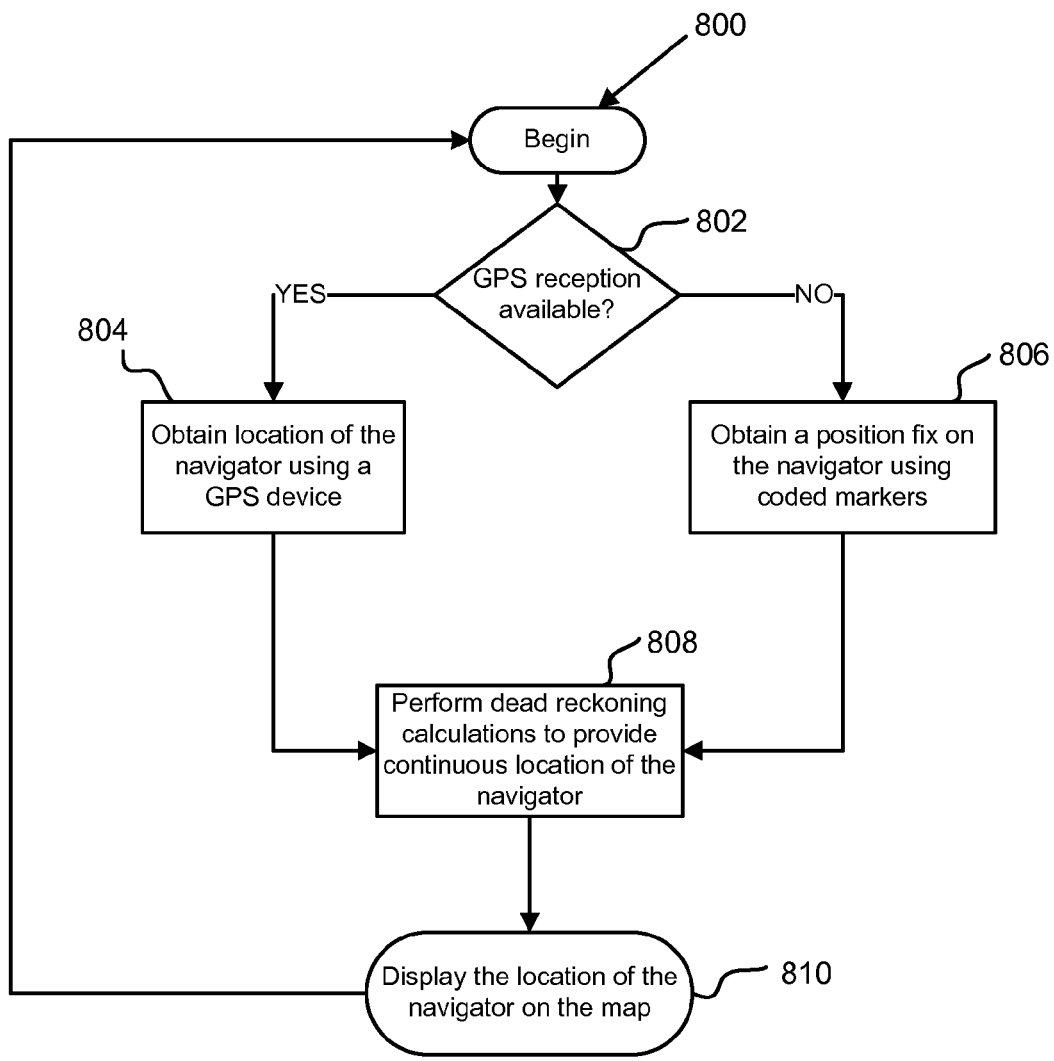
FIG. 8 is a flow diagram of one example of a method of determining a location of the navigator, including supplementing location information obtained by a GPS unit, according to aspects of the present invention.

For example, referring to FIG. 8, at step 802, a method 800 includes determining whether GPS reception is available using the GPS unit 210. If GPS reception is available, the GPS unit obtains location of the navigator using the common GPS location methods (step 804). If GPS reception is not available, the method obtains the position fix on the navigator using the coded marker methods 300 or 700, as described above (step 806). This position fix may supplement or replace the location information determined by the GPS unit in the GPS denied environment. As described above, dead reckoning calculations are then performed until another position fix may be obtained from a subsequent coded marker or alternatively until reception is restored to the GPS unit (step 808). The result is continuous location information of the navigator that optionally can be correlated to the map database 216 and displayed on the display 214 (step 810).

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of determining a location of a navigator on a roadway, the method comprising:
   obtaining a plurality of images of a scene including at least one barcode marker at different times as the navigator moves, wherein the at least one barcode marker is disposed on infrastructure along the roadway;
   reading the at least one barcode marker in the plurality of images;
   representing a forward heading of the navigator as aligned with the roadway and having an azimuth offset of zero;
   determining a first relative azimuth offset between the navigator and the at least one barcode marker in a first image of the plurality of images of the scene;
   determining a second relative azimuth offset between the navigator and the at least one barcode marker in a second image of the plurality of images of the scene, wherein the first and second relative azimuth offsets comprise an angular change from the forward heading of the navigator; and
   geometrically calculating a position fix on the location of the navigator based on a known location of the at least one barcode marker and the first and second relative azimuth offsets at least in part by determining a distance from the navigator to the at least one barcode marker based on the first and second azimuth offsets and a distance traveled between obtaining the first image and the second image.

2. The method of claim 1, wherein reading the at least one barcode marker in the plurality of images further comprises:
   extracting an image of one of the at least one barcode marker from the plurality of images of the scene;
   decoding the image of one of the at least one barcode marker into a database value; and
   accessing a database to retrieve the known location of one of the at least one barcode marker based on the database value.

3. The method of claim 1, wherein reading the at least one barcode marker in the plurality of images further comprises:
   extracting an image of one of the at least one barcode marker from the plurality of images of the scene; and
   decoding the image of one of the at least one barcode marker into the known location of the at least one barcode marker.

4. The method of claim 1, wherein geometrically calculating the position fix on the location of the navigator, further includes:
   determining the position fix on the location of the navigator based on the known location of at least two barcode markers in at least two images of the scene;
   determining a distance traveled between the at least two images;

determining at least two relative azimuth offsets between the navigator and one of the at least two barcode markers in the image of the scene based on the distance traveled; and geometrically calculating the position fix on the navigator from the at least two relative azimuth offsets.

5. The method of claim 1, wherein the geometrically calculating a position fix on the location of the navigator further comprises determining the distance from the navigator to the at least one barcode marker by determining dimensions of the at least one barcode marker in the plurality of images of the scene.

6. The method of claim 1, wherein geometrically calculating a position fix on the location of the navigator further comprises:

obtaining location information of the navigator using a GPS unit; and in a GPS denied environment, supplementing the location information from the GPS unit with the position fix obtained from at least one barcode marker.

7. The method of claim 1, further comprising correlating the position fix on the location of the navigator to map data.

8. The method of claim 1, wherein obtaining the plurality of images of the scene further comprises obtaining the plurality of images using a 360 degree camera.

9. The method of claim 1, wherein geometrically calculating a position fix on the location of the navigator further comprises:

determining a plurality of position fixes; and performing dead reckoning computations between the plurality of position fixes to provide for continuous location of the navigator.

10. The method of claim 9, wherein performing the dead reckoning computations between the plurality of position fixes comprises:

monitoring speed of the navigator;

determining a heading of the navigator; and extrapolating the location of the navigator based on one of the plurality of position fixes, the speed of the vehicle and the heading.

11. A navigation system comprising:

a camera apparatus configured to obtain an image of a scene containing images of at least one barcode marker in a navigation environment, wherein the barcode marker is disposed on infrastructure along a roadway;

video analytics configured to read the at least one barcode marker; and a processor coupled to the video analytics and configured to:

represent a forward heading of the navigator as aligned with the roadway and having an azimuth offset of zero;

determine a position fix of a navigator on the roadway based on a known location of the at least one barcode marker;

determine a first relative azimuth offset between the navigator and the at least one barcode marker in the image of the scene;

determine a second relative azimuth offset between the navigator and a second barcode marker in the image of the scene, wherein the first and second relative azimuth offsets comprise an angular change from the forward heading of the navigator; and geometrically calculate the position fix on the navigator based on the first relative azimuth offset and the second relative azimuth offset and a distance traveled between obtaining the first image and the second image.

12. The navigation system of claim 11, wherein the camera apparatus comprises a 360 degree camera.

13. The navigation system of claim 11, wherein the processor is further configured to obtain a plurality of position fixes based on the known location of the at least one barcode marker and to perform dead reckoning computations in-between the plurality of position fixes to provide for continuous location of the navigator.

14. The navigation system of claim 11, further comprising a database comprising:

at least one known location of the at least one barcode marker; and at least one database value correlated to the at least one known location of the at least one barcode marker, wherein video analytics is further configured to extract the image of the at least one barcode marker from the image of the scene and to translate the image of one of the at least one barcode marker into the at least one database value.

15. The navigation system of claim 11, wherein the system further comprises a GPS unit configured to obtain location information of the navigator, wherein the processor is configured to supplement the location information of the navigator obtained from the GPS unit with a position fix based on the known location of the at least one barcode marker.

16. The navigation system of claim 11, wherein the processor is further configured to determine the position fix on the location of the navigator by determining a distance of the navigator to one of the at least one barcode marker.

17. The navigation system of claim 11, further comprising:

a map database, wherein the processor is configured to relate the position fix of the navigator to the map database; and a display configured to display a visual representation of the map database and to place the position fix of the navigator in the visual representation.

* * * * *